United States Patent
Maebuchi

(10) Patent No.: US 9,226,522 B2
(45) Date of Patent: Jan. 5, 2016

(54) METHOD FOR IMPROVING STORAGE STABILITY OF PROTEIN DRINK

(75) Inventor: Motohiro Maebuchi, Izumisano (JP)

(73) Assignee: FUJI OIL HOLDINGS INC., Osaka (JP)

( * ) Notice: Subject to any disclaimer, the term of this patent is extended or adjusted under 35 U.S.C. 154(b) by 21 days.

(21) Appl. No.: 13/699,870

(22) PCT Filed: May 23, 2011

(86) PCT No.: PCT/JP2011/061735
§ 371 (c)(1),
(2), (4) Date: Nov. 26, 2012

(87) PCT Pub. No.: WO2011/148889
PCT Pub. Date: Dec. 1, 2011

(65) Prior Publication Data
US 2013/0071541 A1    Mar. 21, 2013

(30) Foreign Application Priority Data
May 27, 2010 (JP) .................................. 2010-121165

(51) Int. Cl.
| A23L 2/00 | (2006.01) |
| A23L 2/44 | (2006.01) |
| A23L 2/38 | (2006.01) |
| A23L 2/66 | (2006.01) |
| A23L 2/52 | (2006.01) |
| A23L 1/035 | (2006.01) |
| A23L 1/0524 | (2006.01) |

(52) U.S. Cl.
CPC . *A23L 2/44* (2013.01); *A23L 1/035* (2013.01); *A23L 1/0524* (2013.01); *A23L 2/38* (2013.01); *A23L 2/52* (2013.01); *A23L 2/66* (2013.01)

(58) Field of Classification Search
None
See application file for complete search history.

(56) References Cited

U.S. PATENT DOCUMENTS

| 4,931,300 | A * | 6/1990 | Monte ............................ 426/335 |
| 6,974,597 | B2 * | 12/2005 | Ohta et al. ..................... 426/590 |
| 2005/0233051 | A1 * | 10/2005 | Shen .............................. 426/590 |
| 2006/0003053 | A1 * | 1/2006 | Ekanayake et al. ............. 426/51 |
| 2006/0257544 | A1 * | 11/2006 | Edens et al. ................... 426/590 |
| 2009/0169691 | A1 * | 7/2009 | Duan et al. ................. 426/330.4 |

FOREIGN PATENT DOCUMENTS

| CN | 101427709 | 5/2009 | |
| CN | 101449707 | 6/2009 | |
| JP | 2000-93082 | 4/2000 | |
| JP | 2000-300226 | 10/2000 | |
| JP | 2004081002 A * | 3/2004 | ............... A23L 2/62 |
| JP | 2005-192557 | 7/2005 | |
| JP | 2005-287506 | 10/2005 | |
| JP | 2005-295875 | 10/2005 | |
| JP | 2006-6276 | 1/2006 | |
| JP | 2006-061139 | 3/2006 | |
| WO | 2005/102074 | 11/2005 | |
| WO | 2007/059840 | 5/2007 | |

OTHER PUBLICATIONS

International Search Report issued Jul. 12, 2011 in International (PCT) Application No. PCT/JP2011/061735.
International Preliminary Report on Patentability and Written Opinion issued Dec. 4, 2012 in International (PCT) Application No. PCT/JP2011/061735.
Office Action issued Aug. 21, 2013 in corresponding Chinese Application No. 201180026330.2, with English translation.
Office Action issued May 4, 2014 in corresponding Chinese Application No. 201180026330.2, with English language translation thereof.
Extended European Search Report issued Mar. 16, 2015 in corresponding European Application No. 11786588.1.

* cited by examiner

*Primary Examiner* — Humera Sheikh
*Assistant Examiner* — Tamra L Dicus
(74) *Attorney, Agent, or Firm* — Wenderoth, Lind & Ponack, L.L.P.

(57) ABSTRACT

Disclosed is a method for obtaining an improved drink, in particular a method for suppressing turbidity and sediment of an acidic drink that contains a peptide when the acidic drink is stored for a long period of time. In a basic method for suppressing turbidity and sediment, pectin and a fatty acid ester emulsifier are added to an acidic drink that contains a peptide. In this connection, it is appropriate that the stabilizers are respectively added in an amount of 1-10% by weight relative to the amount of the peptide. In addition, the pH of the acidic peptide drink is preferably 2.5-5.0; a peptide to be used preferably has a degradation rate of 10% or more and a free amino acid content of 50% or less; and the protein concentration in the drink is preferably 0.1-5.0% by weight.

9 Claims, No Drawings

METHOD FOR IMPROVING STORAGE STABILITY OF PROTEIN DRINK

TECHNICAL FIELD

The present invention relates to a method for obtaining a beverage having improved storage stability. In particular, the present invention relates to a method for preventing a generation of cloudiness and precipitation (dreg) in a peptide-containing acidic beverage during long-term storage.

BACKGROUND ART

A peptide which is prepared by making protein to small molecules with a hydrolysis is an excellent nutritional ingredient because it is digested and absorbed rapidly. A peptide has attracted attention as a health food or a food for athlete because it is recognized that the peptide has various physiological effects such as higher recovering effect of muscle wasting and effect of promoting muscle strength. As a form for ingesting peptide, drink form is convenient. In fact, a wide variety of beverages such as lactic acid bacteria beverage, tea-based beverage and sports drink are known. Among them, acidic clear beverage has broad utility and is more favorable because it has pleasant sour taste and clear appearance.

However, there is a problem that an acidic clear beverage containing peptide generates cloudiness and precipitation during long-term storage and that a commercial value of the beverage is reduced. As a method for preventing a generation of cloudiness and precipitation in beverage, using emulsifier has been known (patent document 1), but an effect of dissolving precipitate in the method is insufficient. A method of reducing pH has also been known (patent document 2). Although a solubility of peptide is increased in the method, the method has a taste problem that acidic taste becomes too strong. In addition, using a pectin (patent document 3) shows effect of preventing a generation of precipitation, that is, effect of dispersion and stabilization of dreg component, but this method generates cloudiness and is insufficient for clear beverage.

PRIOR ART DOCUMENTS

Patent Documents

Patent Document 1: JP 2005-295875 A
Patent Document 2: JP 2006-061139 A
Patent Document 3: JP 2005-192557 A

SUMMARY OF THE INVENTION

Problems to be Solved by the Invention

An object of the present invention is to obtain an excellent peptide-containing acidic beverage which does not generate cloudiness and precipitation during long-term storage, and to provide a method for producing the same.

Means for Solving the Problems

The present inventors have intensively studied to solve the above problems, and have found that significant effect is obtained by adding a combination of fatty acid ester emulsifier and pectin to beverage. Thus, the present invention has been completed. That is, the present invention is:

(1) A method for preventing a generation of cloudiness and precipitation in a peptide-containing acidic beverage comprising adding a pectin in combination with a fatty acid ester emulsifier to the peptide-containing acidic beverage;

(2) The method according to (1), wherein the peptide has 10% or more of TCA solubility and 50% or less of free amino acid content;

(3) The method according to (1), wherein the fatty acid ester emulsifier is polyglyceryl fatty acid ester;

(4) The method according to (1), wherein the pectin is HM pectin;

(5) The method according to (1), wherein pH of the peptide-containing acidic beverage is in the range from 2.5 to 5;

(6) The method according to (1), wherein the peptide-containing acidic beverage contains peptide at a concentration of 0.1 to 5.0 wt % in terms of protein content;

(7) The method according to (1), wherein an adding amount of the pectin and the fatty acid ester emulsifier is respectively 1 to 10 wt % with respect to peptide content;

(8) A method for producing a peptide-containing acidic beverage comprising adding a pectin in combination with a fatty acid ester emulsifier to the peptide-containing acidic beverage, wherein a generation of cloudiness and precipitation in the peptide-containing acidic beverage is prevented; and (9) A peptide-containing acidic beverage comprising a pectin and a fatty acid ester, wherein a generation of cloudiness and precipitation in the peptide-containing acidic beverage is prevented and storage stability of the peptide-containing acidic beverage is improved.

Effect of the Invention

A peptide-containing acidic beverage obtained by a method of the present invention has clear appearance and does not generate cloudiness and precipitation even after long-term storage unlike a conventional product. A peptide can be ingested from the peptide-containing acidic beverage of the present invention as a favorite beverage.

MODE FOR CARRYING OUT THE INVENTION

Hereinafter, the present invention will be explained in more detail.
(Peptide)
A peptide used in the present invention can be obtained by hydrolyzing ordinary protein components. Protein as a starting raw material includes a protein derived from plant or animal such as milk, meat, egg, soybean, pea and corn. In addition, a material in which protein is concentrated such as casein and soybean protein isolate is preferable. A hydrolysis of protein is degradation or making the protein low-molecule with an acid or an enzyme. An enzyme hydrolysis is preferable in respect of a control of taste and degradation degree. In particular, a soybean peptide which is obtained by hydrolysing soybean protein with an enzyme is preferable in respect of taste and easy availability.

When a protein is degraded with enzyme, the protein can be degraded by reacting proteolytic enzyme (protease) to a solution or slurry of the above protein material derived from plant or animal as a substrate. As a protease used herein, exoprotease and endoprotease can be used alone or in combination, and the protease can be animal-origin, plant-origin, or microorganism-origin.

Reaction pH and reaction temperature depend on optimized condition and activatable condition of each proteases. In particular, when two or more proteases are used in combination, it is preferable to select a condition that both proteases are activated. In addition, the reaction solution can be heated after the reaction to deactivate a remaining enzyme activity.

The reaction solution can be dried directly or adjusted to arbitrary pH. However, in the case of a beverage use that clarity is required, it is preferable that precipitation and cloudiness are removed by centrifugation, filtration or the like.

A degradation rate of protein can be arbitrarily chosen, but 10% or more is preferable. The degradation rate is preferably 50% or more, more preferably 80% or more. When the degradation rate is low, characteristics of peptide such as easily-absorbed property become weak. In the case of a composition having high free amino acid content after excessive degradation, characteristics of peptide are lost and taste of amino acid becomes too strong. Therefore, the free amino acid content is preferably 50% or less, more preferably 20% or less. A degradation rate of degraded protein is calculated as a proportion of protein content, which is determined by adding an equivalent amount of 30 wt % of trichloroacetic acid to 1 wt % concentration of sample and then centrifuging at 3,000 rpm for 10 minutes followed by measuring the protein content in the obtained supernatant, to a whole crude protein content, which is measured in advance based on the Kjeldal method. In addition, a free amino acid content rate is determined by measuring free amino acid content by adding an equivalent amount of 3% of sulfosalicylic acid to a sample (4 mg/ml) and shaking at room temperature for 15 minutes, and then centrifuging at 10,000 rpm for 10 minutes, filtering the obtained supernatant with 0.45 μm filter followed by measuring free amino acid content of the filtered supernatant with amino acid analyzer (L-8900 manufactured by Hitachi Co.). Amino acid content rate is calculated as an amount with respect to a crude protein content of raw material peptide.

(Emulsifier)

As an emulsifier used in the present invention, fatty acid ester emulsifier is preferable. A "fatty acid ester emulsifier" refers to an emulsifier containing fatty acid as structural component thereof, and includes, for example, sucrose fatty acid ester and glyceryl fatty acid ester. In particular, polyglyceryl fatty acid ester is preferable. A polymerization degree of glycerin in a polyglyceryl fatty acid ester is preferably about 8 to 12, in particular, average polymerization degree of 10 is preferable. A fatty acid as structural component of emulsifier is preferably, but not limited to, a fatty acid having a chain length of 12 to 14. In addition, from another standpoint, emulsifier having higher HLB value is preferable. HLB value is preferably 14 or more, more preferably 16 or more. The above explained polyglyceryl fatty acid ester having a chain length of 12 to 14 most commonly satisfies this HLB range.

(Pectin)

As a pectin in the present invention, commercially available apple or citrus pectin can be used. The pectin is preferably, but not limited to, a HM pectin having higher esterification degree. In addition, the esterification degree is more preferably 70% or more.

(Peptide-Containing Beverage)

A peptide-containing acidic beverage used in the present invention preferably has 0.1 to 5.0 wt % of protein content and pH of 2.5 to 5.0. In addition, other than peptide, pectin and fatty acid ester emulsifier, pH adjuster such as organic acid, sweetener such as sucrose, fructose and glucose, and various fruit juices, fat and oil, flavor, colorant and the like, and carbon dioxide can be added as long as these additives do not prevent the effect of the present invention.

A timing of adding pectin and polyglyceryl fatty acid ester is not particularly limited, and can be chosen during the production process. However, enough effect cannot sometimes be obtained when pectin and polyglyceryl fatty acid ester are added after generating bonds between each proteins. Therefore, most preferable adding timing is before heat pasteurization of the beverage. Because the heat treatment enhances generating bonds between each proteins and causes generating precipitation. In addition, presence or absence of the heat pasteurization is not a problem in the present invention.

A generation of cloudiness and precipitation is effectively prevented when additive amount of pectin and polyglycerin fatty acid ester is in the range from 1 to 10 wt % with respect to peptide content, respectively. When the additive amount is 1 wt % or less, a generation of cloudiness and precipitation may not be prevented. When the additive amount is 10 wt % or more, a generation of cloudiness and precipitation derived from pectin and polyglycerin fatty acid ester themselves may be caused, and unpleasant effect to taste may be caused because off-taste specific to polyglycerin fatty acid ester may be felt.

(Method for Evaluation of Beverage after Storage)

Five wt % concentration of peptide solutions (pH 3.8) including 4 wt % of each emulsifier/stabilizer are prepared and heated at 85° C. for 30 minutes. After 1 week storage at room temperature or 50° C., presence or absence of cloudiness and precipitation is evaluated by visual observation, and OD 610 nm (10 mm cell) value of storage solution is measured after stirring.

EXAMPLES

Hereinafter, the present invention will be described in more details based on Examples.

Example 1

Commercially available soybean protein isolate degradation product ("Hinute AM" manufactured by Fuji Oil Co., Ltd.) was used as a peptide. A degradation rate and a free amino acid content rate of Hinute AM are 98% and 3%, respectively. M-7D manufactured by Mitsubishi-Kagaku Foods Corporation (average polymerization degree of glycerin: 10, carbon number of major fatty acid: 14, HLB; 16) was used as a polyglycerin fatty acid ester. ASD540 manufactured by Danisco AS (citrus-origin, esterification degree: about 70%) was used as a pectin. To 10 g of Hinute AM, deionized water was added to make 100 g solution. To 0.4 g of M-7D and 0.4 g of ASD540, deionized water was added to make 100 g solution. Both solutions are mixed to prepare 5 wt % concentration of peptide solution. Additive amounts of M-7D and ASD540 were 4 wt % with respect to peptide, respectively. And then, pH of the solution was adjusted to 3.8 followed by heating the solution at 85° C. for 30 minutes.

Comparative Examples

As Comparative Examples, an example that only water was added and an emulsifier and a pectin were not added to the peptide solution prepared in the same manner in Example 1 (Comparative Example 1, control), an example in which only pectin was added (Comparative Example 2), and an example in which only emulsifier was added (Comparative Example 3) were prepared, and evaluated their conditions after storage. Results are shown in table 1.

TABLE 1

Effects of additives

| No. | Additive | Storage at room temperature | | | Storage at 50° C. | | |
|---|---|---|---|---|---|---|---|
| | | Cloudiness | Precipitation | OD610 | Cloudiness | Precipitation | OD610 |
| Control | None | Presence | Presence | 0.121 | Presence | Presence | 0.140 |
| Comparative Example 2 | ASD540 | Presence | Slightly presence | 0.119 | Presence | Presence | 0.154 |
| Comparative Example 3 | M-7D | Absence | Slightly presence | 0.052 | Absence | Slightly presence | 0.092 |
| Example 1 | M-7D + ASD540 | Absence | Absence | 0.050 | Absence | Absence | 0.076 |

As shown in table 1, generation of cloudiness and precipitation were confirmed in control in which an emulsifier and a pectin were not added. On the other hand, no cloudiness and precipitation was observed in Example in which both were added in combination. In the case of adding only emulsifier, cloudiness was slightly improved but precipitation was slightly generated. On the other hand, in the case of adding only pectin, effect of preventing precipitation was confirmed but cloudiness was observed. Although a polyglyceryl fatty acid ester had high effect of dissolving precipitation, generation of precipitation could not be completely prevented. In addition, although cloudiness was observed, generation of precipitate was prevented by adding a pectin. It is thought that solubilization effect and precipitation-suppressing effect (dispersing effect) are provided in a synergistic manner by using a polyglyceryl fatty acid ester and a pectin in combination.

Example 2 and Example 3

Other fatty acid ester emulsifiers were tested in the similar condition described in Example 1. As the emulsifiers, sucrose fatty acid ester having same carbon number of fatty acid and HLB value as M-7D (Example 2: M-1695 manufactured by Mitsubishi-Kagaku Foods Corporation) and polyglyceryl fatty acid ester having different carbon number of fatty acid from M-7D (Example 3: L-7D manufactured by Mitsubishi-Kagaku Foods Corporation, average polymerization degree of glycerin: 10, carbon number of major fatty acid: 12, HLB; 16) were used. Other conditions were same as Example 1. Results are shown in table 2.

TABLE 2

Difference of kinds of emulsifier

| No. | Additive | Storage at room temperature | | | Storage at 50° C. | | |
|---|---|---|---|---|---|---|---|
| | | Cloudiness | Precipitation | OD610 | Cloudiness | Precipitation | OD610 |
| Control | None | Presence | Presence | 0.129 | Presence | Presence | 0.145 |
| Example 2 | M-1695 + ASD540 | Absence | Absence | 0.064 | Slightly presence | Absence | 0.110 |
| Example 3 | L-7D + ASD540 | Absence | Absence | 0.060 | Slightly presence | Absence | 0.102 |

As shown in table 2, cloudiness and precipitation were hardly observed in the case of using a sucrose fatty acid ester as emulsifier. However, a polyglyceryl fatty acid ester is more preferable because a stability of sucrose fatty acid ester under acidic condition is generally weaker than that of polyglyceryl fatty acid ester. In addition, in the case of using L-7D having different carbon number of fatty acid from that of M-7D, effect of preventing a generation of cloudiness and precipitation during storage at room temperature by using L-7D and ASD540 in combination was confirmed. However, in the case of using L-7D, the effect is deteriorated under storage at 50° C.

Comparative Examples, Effect of Other Additives

Effects of various other additives were tested. Effects of additives, cyclodextrin (Isoelite P manufactured by ENSUIKO Sugar Refining Co., Ltd.), carboxymethylcellulose (CMC daicel 1250 manufactured by Daicel Chemical Industries, Ltd.) and gum arabic (Gum Arabic SD manufactured by San-Ei-Gen FFI Co., Ltd.), were evaluated. Results are shown in table 3, but effects of preventing a generation of cloudiness and precipitation were not observed by these additives.

TABLE 3

Effect of other additives

| No. | Additive | Storage at room temperature | | |
|---|---|---|---|---|
| | | Cloudiness | Precipitation | OD610 |
| Control | None | Presence | Presence | 0.132 |
| Comparative Example 4 | Cyclodextrin | Presence | Presence | 0.126 |
| Comparative Example 5 | Carboxymethyl-cellulose | Presence | Presence | 0.169 |
| Comparative Example 6 | Gum arabic | Presence | Presence | 0.170 |

INDUSTRIAL APPLICABILITY

The present invention allows to prevent a generation of cloudiness and precipitation in a peptide-containing acidic beverage during long-term storage by adding pectin and polyglyceryl fatty acid ester. A peptide-containing beverage product with clear appearance, coolness and enhanced marketability, and without precipitation and cloudiness, can be obtained according to the present invention. Therefore, the present invention is available in the food industry for adding high-value.

The invention claimed is:

1. A method for preventing a generation of cloudiness and precipitation in a peptide-containing acidic beverage comprising adding a pectin in combination with a polyglyceryl fatty acid ester to the peptide-containing acidic beverage, and thereby the generation of cloudiness and precipitation in the peptide-containing acidic beverage comprising the pectin and the polyglyceryl fatty acid ester is prevented, wherein pH of the peptide-containing acidic beverage is in the range from 2.5 to 5, wherein the peptide-containing acidic beverage contains peptide at a concentration of 0.1 to 5.0 wt % in terms of a protein content, and wherein the pectin and the polyglyceryl fatty acid ester are each added in an amount of 1 to 10 wt % with respect to the peptide content.

2. The method according to claim 1, wherein the peptide has 10% or more of TCA solubility and 50% or less of free amino acid content.

3. The method according to claim 1, wherein the pectin is HM pectin.

4. A method for producing a peptide-containing acidic beverage having no generation of cloudiness or precipitation comprising adding a pectin in combination with a polyglyceryl fatty acid ester to the peptide-containing acidic beverage, wherein a generation of cloudiness and precipitation in the peptide-containing acidic beverage comprising the pectin and the polyglyceryl fatty acid ester is prevented, wherein pH of the peptide-containing acidic beverage is in the range from 2.5 to 5, wherein the peptide-containing acidic beverage contains peptide at a concentration of 0.1 to 5.0 wt % in terms of a protein content, and wherein the pectin and the polyglyceryl fatty acid ester are each added in an amount of 1 to 10 wt % with respect to the peptide content.

5. The method according to claim 2, wherein the pectin is HM pectin.

6. The method according to claim 5, wherein the polyglyceryl fatty acid ester has a polymerization degree of 8 to 12 and a HLB value of 14 or more.

7. The method according to claim 4, wherein the polyglyceryl fatty acid ester has a polymerization degree of 8 to 12 and a HLB value of 14 or more.

8. The method according to claim 6, wherein the polyglyceryl fatty acid ester has a HLB value of 16 or more.

9. The method according to claim 7, wherein the polyglyceryl fatty acid ester has a HLB value of 16 or more.

* * * * *